United States Patent [19]

Nuss

[11] Patent Number: 5,668,647
[45] Date of Patent: Sep. 16, 1997

[54] METHOD AND APPARATUS AND FOR PROCESSING ULTRAFAST OPTICAL SIGNALS

[75] Inventor: Martin C. Nuss, Fair Haven, N.J.

[73] Assignee: Lucent Technologies Inc., Murray Hill, N.J.

[21] Appl. No.: 608,972

[22] Filed: Feb. 28, 1996

Related U.S. Application Data

[63] Continuation of Ser. No. 338,912, Nov. 14, 1994, abandoned, which is a continuation-in-part of Ser. No. 177,018, Jan. 4, 1994, abandoned.

[51] Int. Cl.$^6$ .............................. G02B 27/46; G03H 1/16
[52] U.S. Cl. .............................. 359/4; 359/29; 359/27; 359/559
[58] Field of Search .............................. 359/3, 4, 7, 29, 359/559, 561, 563, 566, 27

[56] References Cited

U.S. PATENT DOCUMENTS

| | | |
|---|---|---|
| 3,608,992 | 9/1971 | Phelps . |
| 3,612,641 | 10/1971 | Eaglesfield . |
| 3,899,240 | 8/1975 | Gabor . |
| 4,339,176 | 7/1982 | Lee . |
| 4,948,212 | 8/1990 | Cheng et al. ............... 359/7 |
| 4,971,409 | 11/1990 | Yeh et al. . |
| 5,004,325 | 4/1991 | Glass et al. ............... 359/4 |
| 5,080,464 | 1/1992 | Toyoda . |
| 5,103,324 | 4/1992 | Brandstetter ............... 359/9 |
| 5,150,228 | 9/1992 | Liu et al. . |
| 5,150,229 | 9/1992 | Takesue et al. . |
| 5,216,529 | 6/1993 | Paek et al. . |
| 5,274,716 | 12/1993 | Mitsuoka et al. . |
| 5,289,299 | 2/1994 | Paek et al. . |

OTHER PUBLICATIONS

J. Jahns et al., "Dammann Gratings for Laser Beam Shaping", Opt. Eng. vol. 28, 1989, pp. 1267–1275. No Month.

M.C. Nuss et al., "Time-to-Space Mapping of Femtosecond Pulses", Opt. Lett. vol. 19, 1994, pp. 664–666. No Month.

A. Partovi et al., "Volume Holographic Storage in Hydrogen Treated Germano–Silicate Glass", Appl. Phys. Lett. vol. 64, No. 7, 1994, pp. 821–823. No Month.

A. Partovi et al., "Cr–Doped GaAs/AlGaAs Semi–Insulating Multiple Quantum Well Photorefractive Devices", Appl. Phys. Lett. vol. 62, No. 5, 1993, pp. 464–466. No Month.

K. Smith et al., "All–Optical Clock Recovery Using a Mode–Locked Laser", Electronics Lett., vol. 28, No. 19, Sep. 1992, pp. 1814–1816.

A.M. Weiner et al., "High–Resolution Femtosecond Pulse Shaping", J. Opt. Soc. Am. B, vol. 5, 1988, pp. 1563–1572. No Month.

A.M. Weiner et al., "Programmable Shaping of Femtosecond Optical Pulses by Use of 128–Element Liquid Crystal Phase Modulator", IEEE J. Quant. Electr. vol. 28, No. 4, 1992, pp. 909–920. No Month.

T.K. Woodward et al., "GaAs/AlGaAs FET–SEED Receiver/Transmitters", Osa Proc. on Photonics in Switching, vol. 16, 1993, pp. 89–93. No Month.

A.M. Weiner et al., "Femtosecond Spectral Holography", IEEE Journal of Quantum Electronics, vol. 28, No. 10, Oct. 1992, pp. 2251–2261.

*Primary Examiner*—Jon W. Henry

[57] ABSTRACT

An apparatus and method are disclosed for providing holographic matched filters for application in all-optical holographic processing of ultrahigh-speed optical data. A scaled spatial image of temporal-domain data is provided by a spatial light modulator (SLM). The scaled image of the SLM is read out with a single-mode diode laser and transformed into a wavelength spectrum by a Fourier transform lens. The interference fringe patterns between the spectrum of the scaled spatial data pattern and the reference pattern beam are recorded by a holographic recording medium. Alternatively, the scaled spatial image of the temporal data is fixed in an aperture mask. An apparatus and method are also disclosed for decoding high-speed optical signal packet headers using holographic matched filters.

26 Claims, 3 Drawing Sheets

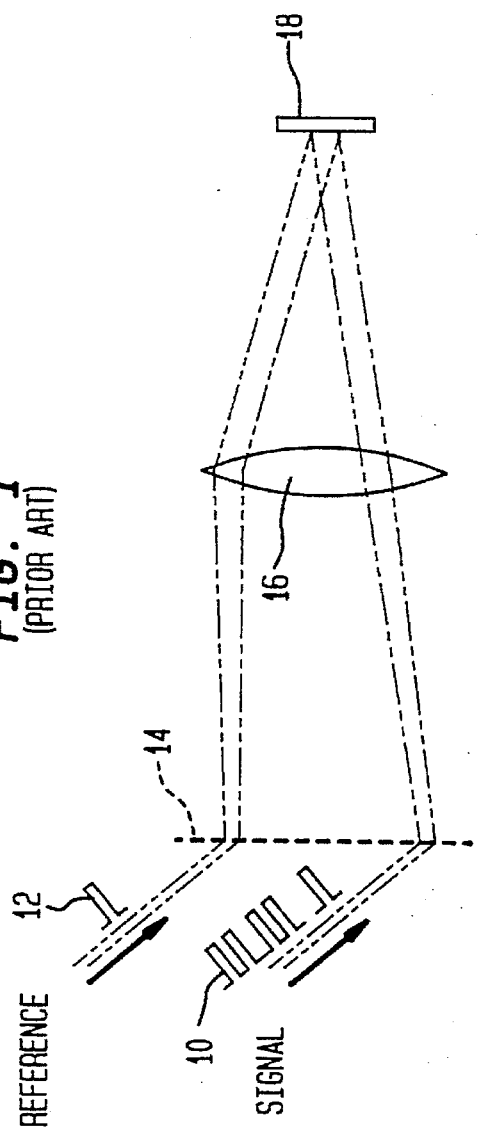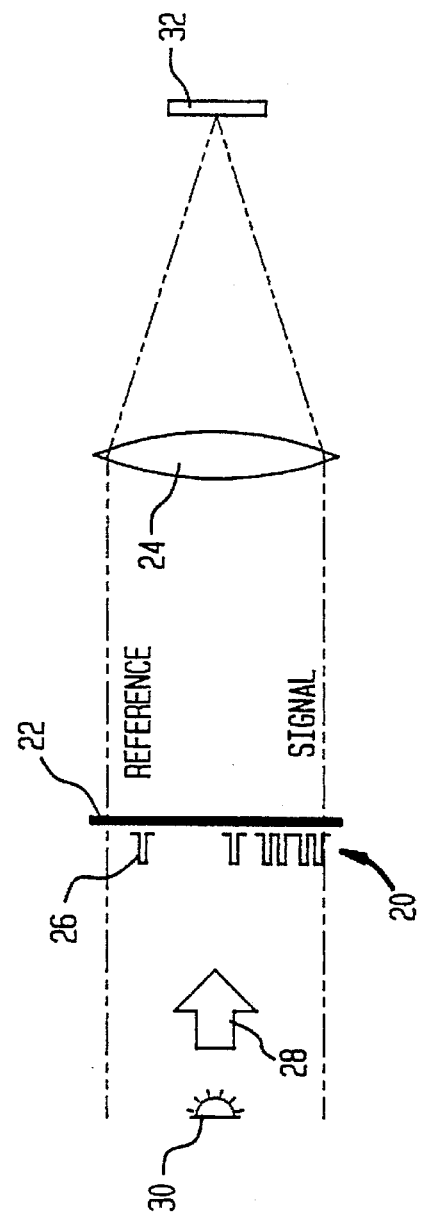

METHOD AND APPARATUS AND FOR PROCESSING ULTRAFAST OPTICAL SIGNALS

CROSS REFERENCE TO RELATED APPLICATIONS

This application is a continuation of application No. 08/338,912, filed Nov. 14, 1994, now abandoned, which is a continuation-in-part of application No. 08/177,018, filed Jan. 4, 1994, now abandoned.

BACKGROUND OF THE INVENTION

1. Field of the Invention

The present invention pertains to high-speed data processing. More specifically, the present invention pertains to the use of spatially-defined holographic matched filters for processing temporal-domain data.

2. Background of the Related Art

FIG. 1 illustrates a prior art technique of generating holograms. A given temporal-domain optical-pulse data pattern 10 and the optical reference pulse 12 are both dispersed by a diffraction grating 14 located at the input focal plane of a lens 16. The two optical beams carrying these pulses then interact with a permanent recording medium 18 located at the spectrum plane of the lens 16. Such holograms may be used as matched filter to store optical data patterns for subsequent comparison with an incident optical signal to generate an optical correlation signal.

In applying matched filters to signal processing in the time domain, the generation of ultrafast signals, that is, signals having bit rates in the Gigabit to Terabit ranges, require the use of ultrafast optical sources, such as CPM dye lasers and other ultrafast coherent optical sources capable of generating pulses in the femtosecond ranges.

SUMMARY OF THE INVENTION

The present invention facilitates the fabrication of holographic matched filters for application in optical holographic processing of high-speed optical data. The present invention uses the principle that a hologram written by a temporal pattern and a temporal reference pulse is indistinguishable from a hologram written by an appropriately scaled spatial image of the temporal pattern and reference.

By applying time-to-space mappings of such ultrafast signals from the time or temporal domain to the spatial domain, as proposed in M. C. Nuss et al., "Time-to-Space Mapping of Femtosecond Pulses", OPT. LETT, VOL. 19, 1994, pp. 664–666, matched filtering of ultrafast signals may be performed.

This invention generates holographic matched filters by spatially mapping temporal optical pulses in a temporal holography setup. The temporal hologram is recorded by use of a beam from a single-mode diode laser.

In a preferred embodiment, a scaled spatial image of the temporal-domain data is dynamically converted by a spatial light modulator (SLM), which includes a liquid crystal SLM or a multiple quantum well (MQW) p-i-n modulator array and recorded by an erasable MQW photorefractive material or a permanent recording material or other recording media known in the art.

In another preferred embodiment, the scaled spatial image of the temporal data is fixed in an aperture mask, and a permanent recording medium is used.

Matched filters recorded in accordance with the present invention reduce the cost of fabrication of such matched filters for multiplexing and demultiplexing of high-speed optical signals, and for decoding optical signal packet headers by using low-maintenance diode laser elements.

BRIEF DESCRIPTION OF THE DRAWINGS

The features of the disclosed holographic matched filter recording and decoding apparatus and method will become more readily apparent and may be better understood by referring to the following detailed description of an illustrative embodiment of the present invention, taken in conjunction with the accompanying drawings, where:

FIG. 1 is a schematic diagram of matched filter recording in accordance with prior art;

FIG. 2A is a schematic diagram of matched filter recording in accordance with the present invention;

DETAILED DESCRIPTION OF THE PREFERRED EMBODIMENT

Figure 2B:
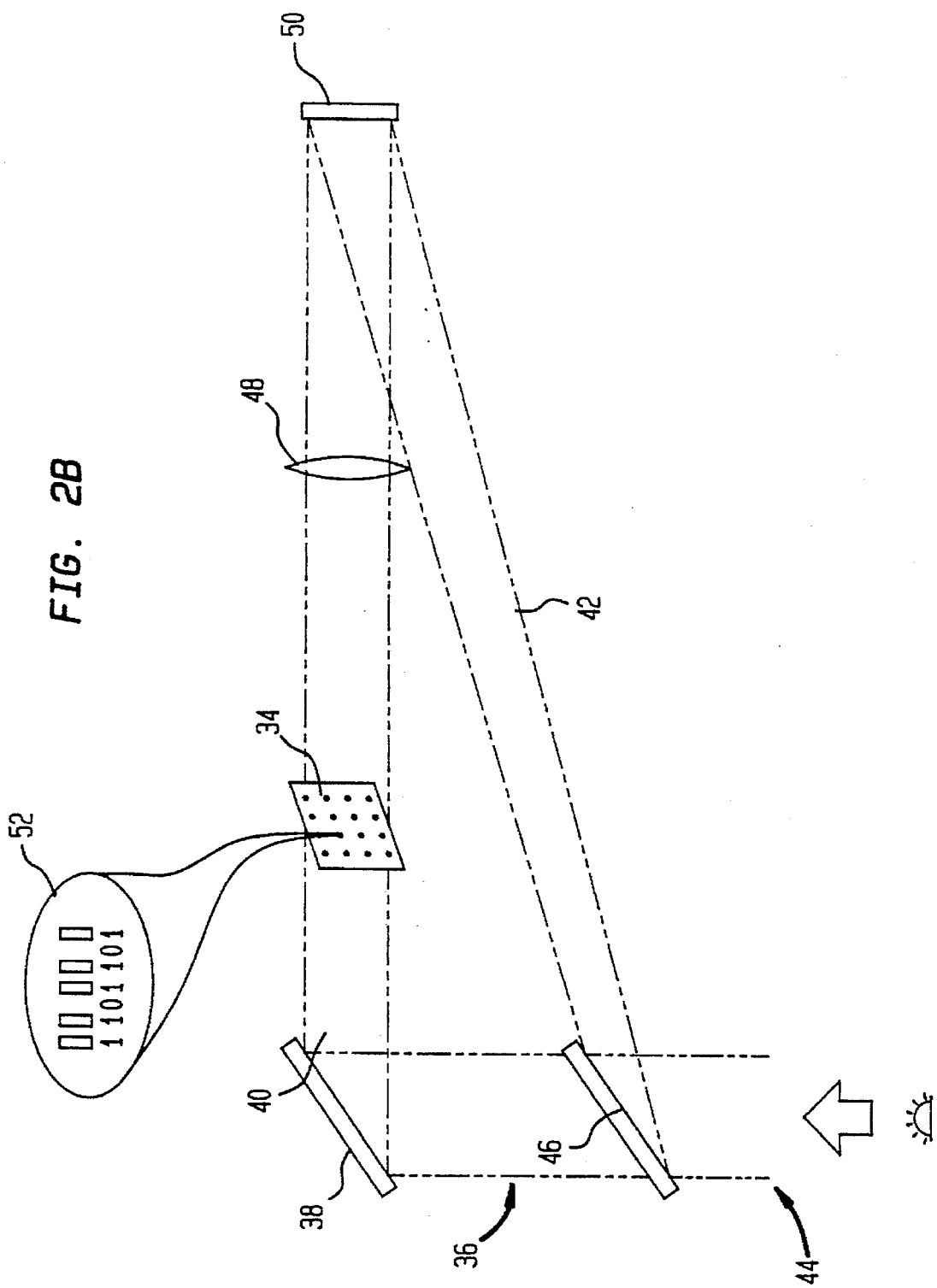
FIG. 2B is a schematic diagram of angle-multiplexed matched filter recording in accordance with the present invention.
Figure 3:
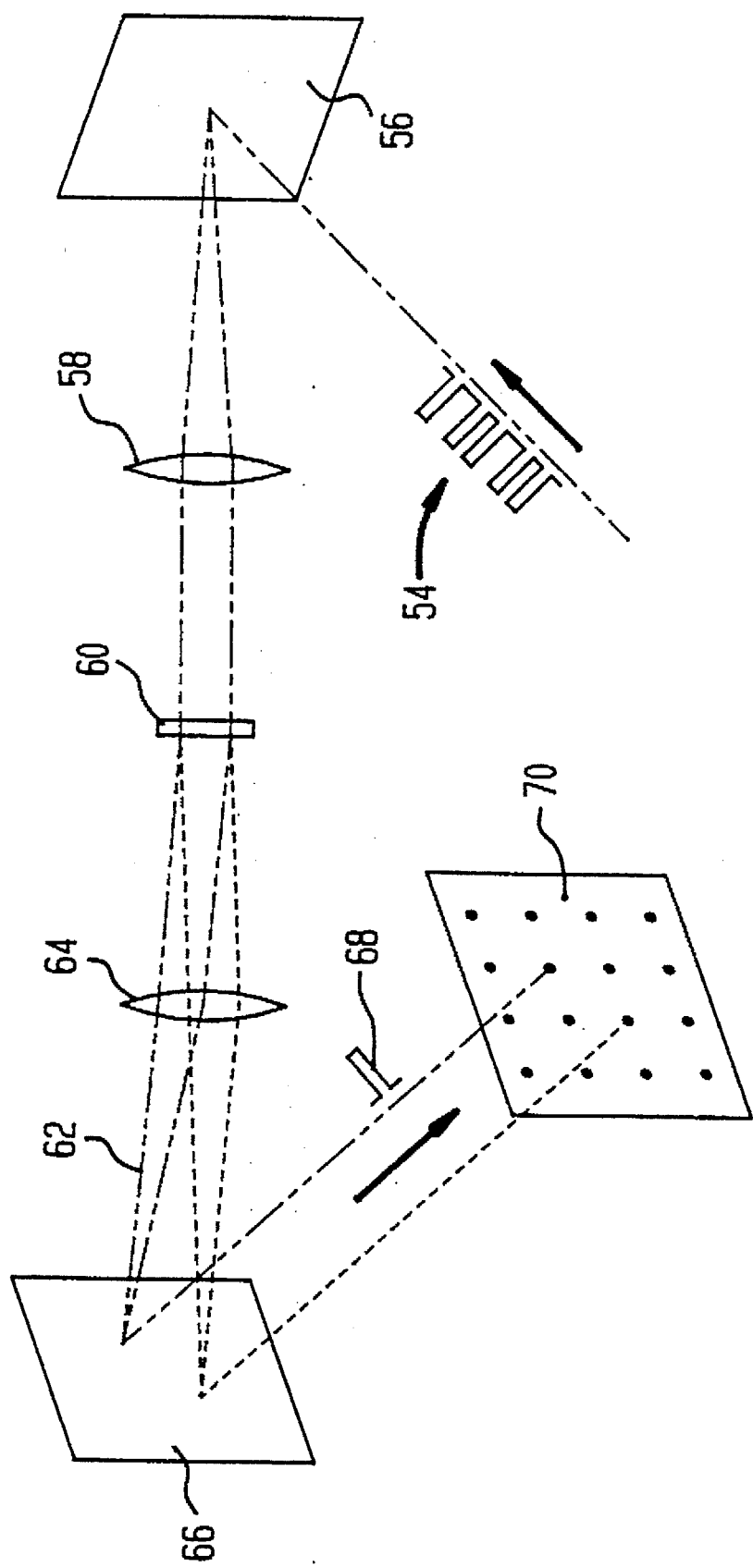
FIG. 3 is a schematic diagram of a real-time femtosecond optical packet header decoder using the hologram recorded by the apparatus shown in FIG. 2B.

Referring now in specific detail to the drawings, with like reference numerals identifying similar or identical elements, as shown in FIGS. 2A–2B and 3, the present disclosure describes the recording of a holographic filter for matched filter processing of temporal-domain optical data using an ultrafast optical patterned signal as well as a reference pulse. In recording processes as described in A. M. Weiner et al., "Femtosecond Spectral Holography", IEEE J. QUANT. ELECTR. VOL. 28, NO. 10, 1992, pp. 2251–2261; optical pulses are provided by a CPM dye laser and the signal pulses are crafted using a phase-only mask or SLM inside a femtosecond pulse shaper, as described in A. M. Weiner et al., "High-Resolution Femtosecond Pulse Shaping", J. OPT. SOC. AM. B, VOL. 5, 1988, p. 1563–1572.

FORMATION OF HOLOGRAPHIC MATCHED FILTERS

In contrast to the prior art shown in FIG. 1, the present invention shown in FIGS. 2A–2B provides holographic matched filter recording to record a hologram for matched-filter processing of the temporal-domain data without requiring ultrafast pulsed signal and reference lasers or coherent optical word generators. Such holographic matched filter recording is proposed in commonly owned U.S. application No. 08/177,018, filed Jan. 4, 1994, now abandoned entitled METHOD AND APPARATUS FOR PROCESSING ULTRAFAST OPTICAL SIGNALS, and U.S. application No. 08/339,055 filed Nov. 14, 1994, now U.S. Pat. No. 5,528,389, entitled AN OPTICAL HOLOGRAPHIC SYSTEM FOR PARALLEL TO SERIAL AND SERIAL TO PARALLEL CONVERSION OF OPTICAL DATA, which are incorporated herein by reference.

In the exemplary embodiments disclosed herein, a temporal-domain optical pulse data pattern is first converted into elements of a spatial, amplitude-modulated "fingerprint" light image. This conversion uses the principle that the Fourier spectrum of a spatial pattern is identical to the wavelength spectrum of a temporal pattern when the temporal information is mapped into spatial information by the following scaling law:

$$t \to \frac{\beta}{c} \cdot x, \quad (1)$$

where $\beta=\lambda/d\cdot\cos\theta$ is the grating constant, $\lambda$ is the wavelength of the laser, c is the speed of light, d is the pitch of the grating which is the inverse of the number of lines per millimeter of the grating, and $\theta$ is the angle of diffraction as the light emerges from the grating.

An example is shown in FIG. 2A in which a holographic matched filter is written for a 7-bit word "1011011", where each bit is 100 femtoseconds (fs) in duration and the temporal spacing between bits is 300 fs. In the exemplary embodiment, the grating has 600 lines/mm, a diffraction angle $\theta$ of 0°, $\lambda$=850 nm, and the focal length of the Fourier lens is 200 mm. In the present example, the time-space mapping constant is 1.7 fs/μm, so that the spatial "fingerprint" is equivalent to 3 regions of 60 μm diameter, with a spacing of 180 μm between the regions. Such regions may be circular or square-shaped spots.

This first "fingerprint" image is generated by supplying the spatial pattern 20, scaled from a temporal-domain optical pattern, to a liquid crystal SLM 22 located at the input plane of a Fourier transform lens 24. Such a Fourier lens 24 is a lens having the distance from an input plane to the lens 24 equal to the distance from the lens 24 to the output plane. The SLM 22 dynamically converts or maps the spatial pattern 20 into scaled images or a "fingerprint". In the present example, a SLM 22 with 60 μm pixel size and 200×300 pixels is used. Each 100 fs bit is represented as a single pixel on the SLM 22.

A second "fingerprint" image of the reference pulse signal is provided by an analogous reference pixel 26 and is applied to the liquid crystal SLM 22, as shown in FIG. 2A, at the input plane of the Fourier transform lens 24. The spacing between the reference pixel 26 and spatial pattern 20 on the SLM 22 determines the fringe spacing on the resulting holographic material. For example, if a 10 μm fringe spacing is desired, the spacing between the reference pixel 26 and the spatial pattern 20 is approximately 3 mm, using a Fourier lens having a 200 mm focal length.

These first and second "fingerprint" images are continuously backlit by a monochromatic plane wave beam of light, indicated by the arrowhead 28, from a collimated single-mode diode laser 30 providing 100 mW at 830 nm to produce interference fringe patterns at a recording medium 32 which becomes a hologram.

Preferably, for ultrafast signal processing of femtosecond optical pulses around 850 nm wavelength, the hologram 32 in FIG. 2A is recorded in a GaAs/AlGaAs MQW material with dimensions 0.5 cm×0.5 cm×1 μm, such as described by A. Partovi et al., "Cr-Doped GaAs/AlGaAs Semi-Insulating Multiple Quantum Well Photorefractive Devices", APPL. PHYS. LETT. VOL. 62, NO. 5, 1993, pp. 464–466. The hologram 32 has a response time of less than 2 μs at an energy density of 1 μJ/cm² and a diffraction efficiency of 3%.

The recording material 32 shown in FIG. 2A may, alternatively, be a thermoplastic or other photorefractive permanent recording medium of similar dimensions; i.e. about 3 mm×3 mm×3 mm, with the size of the hologram being larger than the size of the spectrum of the optical pulses at the spectrum-plane of the instrument. Matched filter recording for temporal-domain optical data signal processing may thus be achieved without the use of ultrafast pulsed and reference lasers. Alternatively, computer-generated holograms, such as binary-phase holograms described in J. Jahns et al., "Dammann Gratings for Laser Beam Shaping", OPT. ENG. VOL. 28, 1989, pp. 1267–1275; may be used. These holograms may be formed by calculating the Fourier-transform of the "image" of the pulses as described above.

It is not a requirement that the wavelength at which the holograms are recorded matches the wavelength used to read out the holograms. This may be particularly advantageous when the response of the hologram is largest at some wavelength other than the readout wavelength, as in the case of Hydrogen-loaded or Germanium-rich glasses, such as described in A. Partovi et al., "Volume Holographic Storage in Hydrogen Treated Germano-Silicate Glass", APPL. PHYS. LETT. VOL. 64, NO. 7, 1994, p. 821–823; or Lithium Niobate photorefractive materials, which are sensitive in the ultraviolet spectral range. In the case of different read and write wavelengths, the time-space scaling factor has to be modified to:

$$\beta/c = \frac{\lambda}{dc \cdot \cos\theta} \cdot \frac{\lambda_w f_w}{\lambda_r f_r} \quad (2)$$

with $\lambda_w$, $\lambda_r$ being the write and read wavelengths, respectively, and f the respective focal lengths used for writing and reading the hologram.

AN ALTERNATIVE RECORDING CONFIGURATION

In an alternative exemplary embodiment, the holographic recording apparatus illustrated in FIG. 2B records an angle-multiplexed hologram for a packet header recognition of ultrashort optical pulses in accordance with the present invention, for example, optical pulses of 100 fs duration spaced 300 fs apart. In FIG. 2B, a holographic matched filter is recorded from the interaction of the light emerging from an array 34 of spatially-encoded signal-pulse patterns back-illuminated by a beam 36 illuminating all apertures of array 34 simultaneously.

The back-illuminating beam 36 and a reference light beam 42 are split off from a laser beam 44 from an optical source by a beam splitter 46. The interference between the light emerging from the array mask 34 and the reference beam 42 produces respective interference fringe patterns at the spectrum plane of the Fourier lens 48. These interactions are stored at respective angular orientations within a hologram 50, determined by their relative placement in the spatially-coded bit array mask 34. Holograms generated from such storage of angular orientations of light interactions are referred to as "angle-multiplexed" holograms in the literature.

In the present alternative embodiment, the array 34 is, for example, a primarily opaque 1"×1.5" sheet of glass coated with chromium and etched with openings in the chromium thin film formed, for example, from a lithographic mask. In this example, there are sixteen code blocks set out on 3 mm centers in a square matrix. The "ones" in each code are indicated by circular transparent patches or "pixels" similar to the light apertures provided by the SLM 22 in FIG. 2A. The transparent patches or pixels of the array 34 are illustrated schematically at 52. In the exemplary embodiment, the grating has 600 lines/mm, a diffraction angle $\theta$ of 0°, $\lambda$=850 nm, and the focal length of the Fourier lens is 200 mm. In this example, five such patches are 60 μm in diameter (1's), and two blanks (0's) are provided at a 180 μm center-to-center spacing within a 3 mm×3 mm portion of the mask 34 and having centers spaced at 3 mm. Images of the bar-shaped transparent patches are Fourier-transformed by the lens 48 and interfere with the reference beam 42 to form the angle-multiplexed hologram 50.

The angle-multiplexed hologram 50 thus recorded is positioned at the spectrum plane of a 200 mm focal length Fourier transform lens 48. In the present alternative embodiment, the sixteen angularly-multiplexed hologram images produced on the hologram 50 by the code patterns in the array 34 may then be used to decode packet headers in pulsed optical communication channels.

DECODING OF PACKET HEADERS

As shown in FIG. 3, a decoding configuration is provided to decode the packet header, where the transmitted optical pulse signal 54 with a bit duration of 100 fs and a bit-to-bit spacing of 300 fs is dispersed by a first reflective diffraction grating 56 having 600 lines/mm and positioned at the input plane of a first Fourier transform lens 58 having a 200 mm focal length. At the spectrum plane of the first Fourier transform lens 58, the wavelength spectrum of the diffracted optical pulse signal 54 is spectrally filtered by a predetermined angle-multiplexed holographic matched filter 60 which may be computer generated. Such spectral filtering produces a beam 62 having an optical correlation peak at the output plane of a second Fourier lens 64 when the code pattern is sufficiently similar enough to produce a detectable correlation peak optical pulse. The beam 62 is back-Fourier-transformed by the second Fourier transform lens 64 having a 200 mm focal length and by the diffraction grating 66. Preferably, the second diffraction grating 66 has 600 lines/mm and is positioned at the output plane of the second Fourier transform lens 64.

In case a match is found, the beam 62 is deflected at an angle determined by the hologram 60 corresponding to the angle between the original pattern and reference beam when the hologram 60 was written.

The diffracted beam 68 from the second diffraction grating 66 is detected by an optical detector array 70, which also determines the angular displacement of the optical correlation pulse to identify the packet header.

While the disclosed holographic matched filter recording and decoding apparatus and method have been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A method for recording a temporal optical pulse pattern in a hologram for time-domain processing of temporal optical data signals, without the need to synthesize the temporal optical signal to be stored, comprising the steps of:

mapping a reference pattern and temporal patterns representing the temporal optical data signals to spatial data patterns using a predetermined time-space scaling law;

providing the spatial data patterns to a spatial light modulator (SLM) to generate scaled spatial signals of the temporal optical data signals;

illuminating the spatial data patterns and pattern with a monochromatic light source;

converting the scaled spatial signals into Fourier transform spectra;

producing interference fringe patterns of the spatial data patterns and reference pattern; and recording the interference fringe patterns with a holographic recording medium.

2. The method of claim 1 wherein the step of providing includes the step of providing the spatial data patterns to a fixed mask as the SLM.

3. The method of claim 1 wherein the step of providing includes the step of providing the spatial data patterns to a liquid crystal SLM.

4. The method of claim 1 wherein the step of providing includes the step of providing an array of the spatial data patterns to an SLM array.

5. The method of claim 4 wherein the step of providing includes the step of providing the array of spatial data patterns to a fixed mask array.

6. The method of claim 4 wherein the step of providing includes the step of providing the array of spatial data patterns to a liquid crystal SLM array.

7. The method of claim 1 wherein the step of converting includes the step of inputting the scaled spatial signals to a Fourier transform lens.

8. The method of claim 1 wherein the step of producing includes the step of providing the monochromatic light source produced by a collimated single mode diode laser.

9. The method of claim 1 wherein the step of recording the interference fringe patterns includes the step of recording with an erasable multiple quantum well (MQW) structure.

10. The method of claim 1 wherein the step of recording the interference fringe patterns includes the step of recording with a permanent multiple quantum well (MQW) structure.

11. The method of claim 1 wherein the step of mapping includes the step of mapping the temporal optical data signals having a duration of around 100 femtoseconds and spaced at around 300 femtoseconds apart.

12. A method for recording a plurality of temporal optical pulse patterns, without the need to synthesize the temporal optical signals to be stored, comprising the steps of:

mapping a reference pattern and the plurality of temporal optical pulse patterns representing the temporal optical data signal to spatial data patterns using a predetermined time-space scaling law;

providing the spatial data patterns to a spatial light modulator (SLM) to generate scaled spatial signals of the temporal optical data signals, while arranging the plurality of spatial data patterns onto spatially separate regions;

illuminating the plurality of spatial data patterns and the reference pattern with a monochromatic light source;

converting the plurality of scaled spatial signals into Fourier transform spectra having associated angular orientations;

producing a plurality of interference fringe patterns of the spatial data patterns and the reference pattern with distinct spatial carrier frequencies depending on the angular orientations of the respective patterns; and recording the plurality of interference fringe patterns with a holographic medium.

13. The method of claim 1, wherein the step of illuminating includes the step of providing a back-illuminating beam and a reference light beam split off from a laser beam.

14. A method for recognizing a temporal optical data pattern which was recorded by the steps of mapping a reference pattern and the temporal optical data pattern to spatial data patterns using a predetermined time-space scaling law, providing the spatial data patterns to a spatial light modulator (SLM) to generate scaled spatial signals of the temporal optical data pattern, illuminating the spatial data patterns and reference pattern with a monochromatic light source, converting the scaled spatial signals into Fourier transform spectra, producing interference fringe patterns of the spatial data patterns and reference pattern, and recording the interference fringe patterns with a holographic medium as a recorded temporal optical data pattern, the method comprising the steps of:

dispersing the temporal optical data pattern from the recorded holographic medium;

converting the dispersed temporal optical data pattern to a Fourier transform spectrum;

providing a holographically matched filter storing a plurality of Fourier transform spectra from a plurality of possible data patterns, each one having an associated angular orientation;

comparing the Fourier transform spectrum with the plurality of Fourier transform spectra stored on the holographically matched filter;

outputting an optical correlation signal at an angle determined by the angular orientation of the Fourier transform spectrum stored in the holographic matched filter that most closely matches the Fourier transform spectrum of the temporal optical data pattern; and recognizing the temporal optical data pattern by detecting the position and the output angle of the optical correlation signal using a detector array that detects the position of the correlation signal.

15. The method of claim 14 wherein the step of converting includes the step of inputting the dispersed temporal optical data pattern to a Fourier transform lens.

16. The method of claim 15 wherein the step of outputting the optical correlation signal includes the steps of:

diffracting the wavelength spectrum signal in response to a match of a code pattern of the wavelength spectrum signal being substantially similar to a holographically stored optical signal of the holographic matched filter to generate a filtered wavelength spectrum signal; and outputting the filtered wavelength spectrum signal at an angle corresponding to the match as the optical correlation signal.

17. The method of claim 16 wherein the step of comparing includes the step of inputting the filtered wavelength spectrum signal to a Fourier lens and a diffraction grating for back-Fourier-transformation.

18. The method of claim 17 wherein the step of detecting the optical correlation signal includes the step of decoding the optical correlation signal using the optical detector array.

19. The method of claim 18 wherein the step of detecting includes the step of determining an angular displacement of the optical correlation signal to identify a packet header of the input temporal optical data pattern.

20. An apparatus for producing holographic matched filters, comprising:

a spatial-domain modulator for modulating spatial patterns representing temporal optical data signals including a reference signal using a predetermined time-space scaling law;

a holographic recording medium;

a lens for converting the modulated spatial patterns into a Fourier spectrum; and a monochromatic optical source for optically projecting the converted modulated spatial patterns onto a holographic recording medium to generate a holographic matched filter.

21. The apparatus of claim 20 wherein the holographic recording medium includes a multiple quantum well device.

22. The apparatus of claim 21 wherein the spatial-domain modulator is a liquid crystal spatial light modulator.

23. The apparatus of claim 20 wherein the spatial-domain modulator modulates a plurality of spatial patterns representing a plurality of temporal optical data signals; and wherein the plurality of converted signals are projected onto the holographic medium to generate the holographic matched filter with multiple signals stored at different angular orientations.

24. An apparatus for producing holographic matched filters for femtosecond optical pulse processing, the apparatus comprising:

a single-mode diode laser emitting a light beam of wavelength $\lambda$;

a spatial light modulator, responsive to input temporal-domain femtosecond optical patterns and input reference patterns, for simultaneous generating corresponding scaled images of the temporal-domain femtosecond optical patterns and reference patterns, respectively, using a predetermined time-space scaling law:

$$t \to \frac{\beta}{c} \cdot x$$

wherein:

$$\beta = \frac{\lambda}{d \cdot \cos\theta} \cdot \frac{\lambda_w f_w}{\lambda_r f_r}$$

is a time-space scaling factor associated with the spatial light modulator, $\theta$ is a diffraction angle associated with the scaled images emitted from the spatial light modulator, c is the speed of light, d is the pitch of the spatial light modulator, $\lambda_w$ is a holographic writing wavelength, $\lambda_r$ is a holographic reading wavelength, $f_w$ is a holographic writing focal length, and $f_r$ is a holographic reading focal length;

a Fourier transform lens having the holographic writing focal length $f_w$ and positioned at the distance $f_w$ from the spatial light modulator with the spatial light modulator being in the input plane of the Fourier transform lens, the Fourier transform lens for converting the scaled images into a Fourier spectrum signal, the Fourier spectrum signal including interference fringe patterns from the simultaneous scaling of both the temporal-domain femtosecond optical patterns and reference patterns; and a recording medium, composed of GaAs/AlGaAs multiple quantum well material adapted for recording femtosecond optical pulses and disposed at the distance $f_w$ from the Fourier transform lens with the recording medium being in the output plane of the Fourier transform lens, the recording medium responsive to the Fourier spectrum signal for recording the interference fringe patterns as a hologram of the temporal-domain femtosecond optical patterns and reference patterns, to generate a holographic matched filter responsive to a monochromatic light source providing a reading light beam having a holographic reading wavelength $\lambda_r$ for outputting read-out optical patterns at the holographic reading focal length $f_r$ corresponding to the temporal-domain femtosecond optical patterns.

25. An apparatus for producing holographic matched filters, the apparatus comprising:

a light source emitting a light beam of wavelength $\lambda$;

scaling means, responsive to input temporal-domain femtosecond optical patterns and input reference patterns, for simultaneous generating corresponding scaled images of the temporal-domain femtosecond optical patterns and reference patterns, respectively, using a predetermined time-space scaling law:

$$t \to \frac{\beta}{c} \cdot x$$

wherein:

$$\beta = \frac{\lambda}{d \cdot \cos\theta} \cdot \frac{\lambda_w f_w}{\lambda_r f_r}$$

is a time-space scaling factor associated with the scaling means, θ is a diffraction angle associated with the scaled images emitted from the scaling means, c is the speed of light, d is the pitch of the scaling means, $\lambda_w$ is a holographic writing wavelength, $\lambda_r$ is a holographic reading wavelength, $f_w$ is a holographic writing focal length, and $f_r$ is a holographic reading focal length;

a Fourier transform lens having the holographic writing focal length $f_w$ and positioned at the distance $f_w$ from the scaling means, with the scaling means being in the input plane of the Fourier transform lens, the Fourier transform lens for converting the scaled images into a Fourier spectrum signal, the Fourier spectrum signal including interference fringe patterns from the simultaneous scaling of both the temporal-domain femtosecond optical patterns and reference patterns; and a recording medium adapted for recording femtosecond optical pulses and disposed at the distance $f_w$ from the Fourier transform lens with the recording medium being in the output plane of the Fourier transform lens, the recording medium responsive to the Fourier spectrum signal for recording the interference fringe patterns as a hologram of the temporal-domain femtosecond optical patterns and reference patterns, to generate a holographic matched filter responsive to a monochromatic light source providing a reading light beam having a holographic reading wavelength $\lambda_r$ for outputting read-out optical patterns at the holographic reading focal length $f_r$ corresponding to the temporal-domain femtosecond optical patterns.

26. The apparatus of claim 25 wherein the scaling means is a grating having the pitch d=1/600 mm, which is the inverse of the number of lines per millimeter of the grating, for facilitating femtosecond optical pulse processing.

* * * * *